June 27, 1939.  B. DIBNER ET AL  2,164,006
SHEET METAL SPLIT-BOLT CONNECTOR
Filed Sept. 10, 1937  2 Sheets-Sheet 1
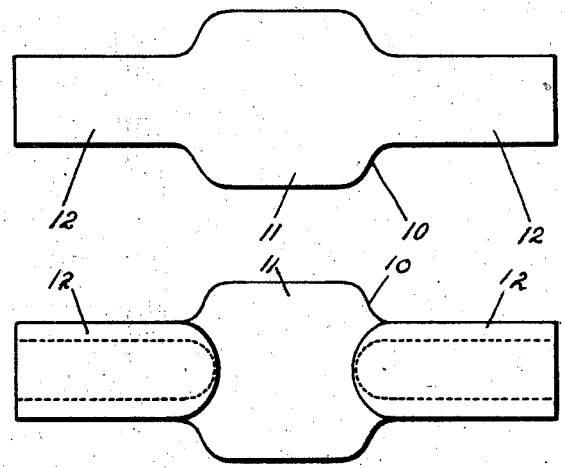
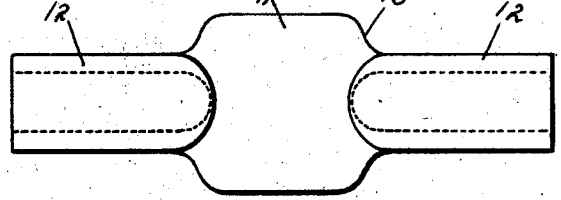
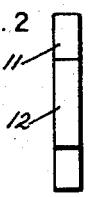
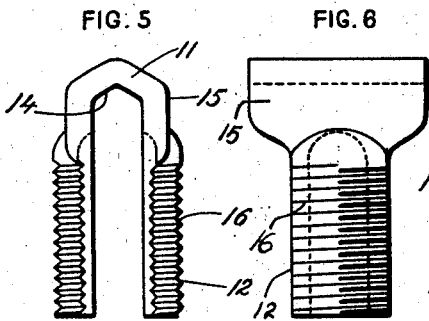
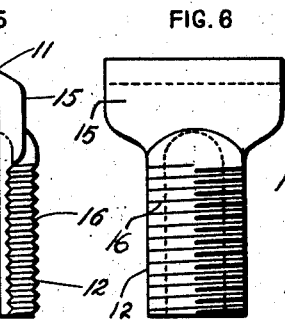
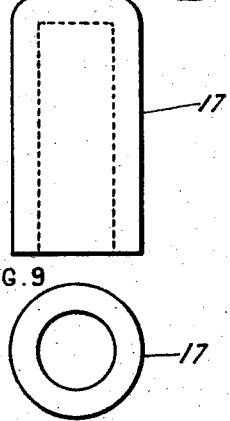
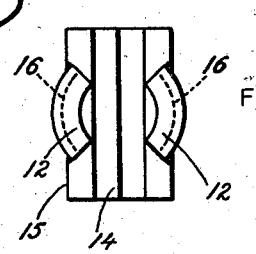
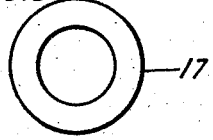
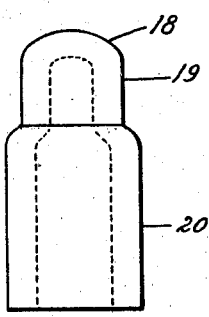
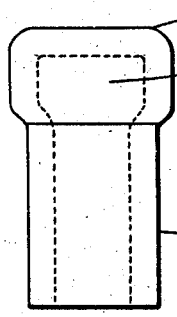
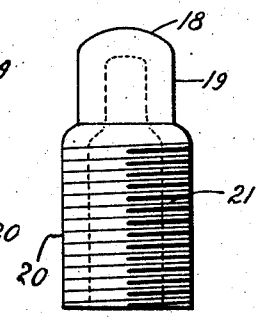
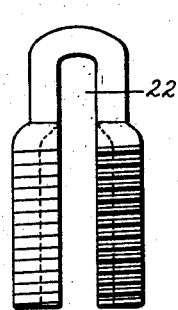
INVENTORS
BERN DIBNER AND JULIAN ROGOFF
BY Harry Ernest Rubens
ATTORNEY June 27, 1939.      B. DIBNER ET AL      2,164,006
SHEET METAL SPLIT-BOLT CONNECTOR
Filed Sept. 10, 1937      2 Sheets-Sheet 2

INVENTORS
BERN DIBNER AND JULIAN ROGOFF
BY Harry Ernest Rubens
ATTORNEY

Patented June 27, 1939

2,164,006

UNITED STATES PATENT OFFICE 2,164,006

SHEET METAL SPLIT-BOLT CONNECTOR

Bern Dibner, Peekskill, and Julian Rogoff, New York, N. Y., assignors to Burndy Engineering Co., Inc., a corporation of New York Application September 10, 1937, Serial No. 163,186

5 Claims. (Cl. 24—243)

Our invention relates to split-bolt connectors for electric cables and more particularly to split-bolt connectors made of sheet metal.

The split-bolt type of electrical connector consists of a U-bolt with legs threaded on the outside only and a slot between the legs; a nut which screws on to the legs; and a follower which rides on the nut and in the slot between the U-bolt legs. In order to get a proper connection with this type of connector, it is essential that high pressures be exerted in clamping the conductors together.

This device is widely used throughout the electrical industry for making electrical connections and more especially by the public utility companies for making service connections. The users of this type of connector, because of the large quantities in which they are purchased, have demanded a less expensive product than can be manufactured by conventional methods. On the other hand, the demand for improved electrical and mechanical properties has been pronounced.

In the past the split-bolts of service connectors were manufactured as screw machine products or as forgings. The screw machine product was the first type available. By this method the split-bolt was manufactured from a free cutting rod in a screw machine. After the rod was threaded and cut to length the threaded stud was then placed in a milling machine and slotted and additional operations were performed to remove burrs and sharp edges. Naturally, this process involved several set-ups in different machines as well as waste of considerable metal. In addition the free cutting rod of which the split-bolts were made, had to be drawn of alloys which could be readily cut and could not be fabricated of the high strength alloys which are very tough and difficult to cut on a screw machine.

The forged split bolt was introduced in an effort to increase the strength of the connector and at the same time decrease the cost. By forging, it was possible to eliminate the waste of material which resulted from cutting the slot in the threaded stud. In addition, the alloys of which the split-bolt could be forged, where the tough high strength alloys which were difficult to cut. This resulted in a connector of high strength and reduced cost.

In spite of the improvement effected by the introduction of the forging process, demand continued for a connector of still greater strength and lower price. In common with screw machine manufacture, the forging process had the disadvantage that several operations were performed and each operation meant a new set-up and handling of the split-bolt. Thus, although the forged split-bolt could be manufactured at a lower price than the screw machine split-bolt, and was a stronger product, there still was a demand for a less expensive and still stronger device.

In order to make a split-bolt of maximum strength by the most economical method, our invention was devised whereby the split-bolt is manufactured of sheet metal. A sheet metal split-bolt may be manufactured on high speed production machinery capable of performing several operations automatically in rapid succession and with no handling by an operator between operations. Sheet metal strip may be fed into the machine and successive operations will blank, clip, form and bend the split-bolt. Even the threading may be accomplished automatically by a finger which carries the unthreaded split-bolt to a threading mechanism.

Alternatively the sheet metal may be cupped, stamped, threaded, and sheared, all automatically. This method is not so desirable as the previous method because of the waste material which must be sheared away in order to form the slot.

Therefore, one object of our invention is to provide a connector made of sheet metal adaptable to mass production methods and wherein waste of material is held to a minimum.

Sheet metal is especially desirable for the fabrication of split-bolts. It can be rolled and drawn from high strength alloys and may be cold worked to a point where the material attains its maximum hardness. From this viewpoint it is superior to both rod and forgings; the first because the rod must be free-cutting; the second because the forging must originally be fabricated from a soft slug and although the metal is hardened by the succeeding cold working operations, it cannot attain a degree of hardness as great or as homogeneous as can be attained with sheet metal.

Accordingly, another object of our invention is to provide a connector of as high strength and hardness as can be obtained from sheet metal.

An extremely important advantage of the split-bolt service connector over types previously used, is that it may be salvaged and reused. However, this calls for a connector which will not be readily distorted. Long before the connector will fail, the legs of the split-bolt will tend to twist with the result that when the connector is used and then removed, the split-bolt will be so distorted as to prevent reuse.

Another object, therefore, of our invention is to provide a connector which will not distort at high values of wrench-torque and will be reusable after being installed.

In order to prevent the legs of the split-bolt from moving in relation to each other, we provide a segmental pocket in the inwardly facing surfaces of the threaded legs. The follower which rides in the slot in the split-bolt is formed with projections which closely fit the segmental pockets. Thus, in addition to providing support to the legs of the split-bolt when pressure is applied by the nut, the follower also prevents the legs of the split-bolt from moving in relation to each other and thereby raises the value of wrench torque necessary to cause distortion of the connector.

Consequently, a still further object is to provide means for reinforcing the legs of the sheet metal split-bolt to prevent distortion or torsional failure.

Another fault, common to the split-bolt connectors now in use, is the "galling" of the metal in the threads where the nut rides on the split-bolt. This "galling" consists of a small particle of metal being worn from the split-bolt by the friction of the revolving nut. This metal particle then travels with the nut and continues to roll up metal from the split-bolt threads, somewhat as a snowball keeps getting larger as it rolls through the snow. This ball of metal finally gets so large that it will jam the nut and make proper tightening of the connector difficult. In addition, it will make it practically impossible to remove the nut from the split-bolt when the joint is to be disconnected and the connector reused.

Another object is to provide a split-bolt connector in which "galling" will be eliminated.

In order to avoid "galling" it is desirable to use a hard alloy which will not wear or seize readily. Greater hardness can be obtained in sheet metal than in either a forging or screw machine products. It is, therefore, evident that the sheet metal connector will be reusable at higher values of wrench-torque from this aspect.

In order to obtain a flat sided head which will provide a firm base for pliers or wrench, the head of the split-bolt is flattened and elongated. This is accomplished by proper forming of the sheet metal blank.

Accordingly, another object of our invention is to provide a connector which can be readily gripped by pliers or wrench in order that it can be tightened securely.

In addition to demanding increased strength and lower cost a considerable number of public utility companies require split-bolt connectors equipped with nut retainers. Such connectors, as made in the past, have usually required several expensive operations to be performed on the split-bolt. We taken advantage of the segmental pocket formed in the leg of our split-bolt to provide space in which a nut retainer can ride and we thus eliminate all except a single simple assembly operation.

Hence, a still further object is to provide a novel nut retainer adaptable for use with a sheet metal split-bolt connector.

Another important advantage of sheet metal is its resiliency. When pressure is applied by tightening the nut there is a tendency for the legs of the split-bolt to collapse inwardly. The follower which rides on the nut and between the legs of the split-bolt supports the legs and prevents failure of the connector by collapse of the legs. In the ordinary split-bolt when the pressure is relieved by unscrewing the nut, the legs of the split-bolt will remain squeezed in tight frictional relationship with the follower, and the nut-follower assembly will be difficult to remove from, or reassemble to, the split-bolt. Because of the springiness which it is possible to obtain with sheet metal, the legs of the split-bolt so made, will recover their original position when pressure is relieved.

Another object therefore, is to obtain a resiliency in the split-bolt connector, to permit stressed parts to spring back to their original position when the stresses are removed.

Still another advantage of sheet metal is the tolerances to which a device made of this material may be held. Inasmuch as the clearances between follower and split-bolt, and between the split-bolt and nut, must be kept small, this is a very important advantage. If the clearances mentioned above are excessive the split-bolt legs will collapse on the follower to such an extent that the nut may ride up and over the tops of the threads on the split-bolt and cause the joint to fail.

Another object therefore, it to provide a split-bolt connector having close tolerances between the legs of the bolt, the follower, and the nut, to avoid thread skipping.

We accomplish these and other objects of our invention by the sheet metal split-bolt connector described in the following specification and illustrated in the accompanying drawings in which:

Fig. 1 is a plan view of the sheet metal blank into which the split-bolt is formed.

Fig. 2 is a side view of the same.

Fig. 3 is a plan view of the blank after an initial forming operation.

Fig. 4 is a side view of the same.

Fig. 5 is a front view of the completely formed and threaded split-bolt.

Fig. 6 is a side view of the same.

Fig. 7 is a bottom view.

Fig. 8 is a side view of a sheet metal cap from which a modified form of split-bolt is made.

Fig. 9 is a bottom view of the same.

Fig. 10 is a front view of the partially finished modification.

Fig. 11 is a side view of the same.

Fig. 12 is a front view after the threading operation.

Fig. 13 is a front view showing the completed split-bolt.

Figure 14:
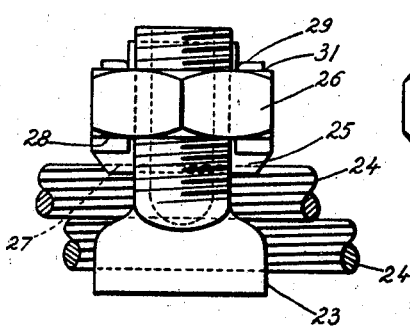
Fig. 14 is a front view of the assembled connector.

Referring more particularly to Figs. 1 and 2 of the drawings, reference numeral 10 designates the blank stamped from sheet metal, having a central head section 11, and two leg sections 12. In Figs. 3 and 4 the two leg sections are rounded, as at 13, so as to form cylindrically shaped legs.

In Figs. 5, 6 and 7, the completely formed sheet metal split-bolt is shown, the head-section 11, V shaped at 14 to allow the entering cable to be properly centered, the external flat side walls 15 permitting a wrench to be applied thereto. Threads 16 are thereafter formed on the legs for threaded engagement with a nut.

The split-bolt may alternatively be drawn from sheet metal into a cap-shaped member 17, as shown in Figs. 8 and 9, the top of which is subsequently formed into a head section 18, having flat sides 19, for permitting a wrench to be applied and a cylindrical body section 20, as shown in Figs. 10 and 11. The body section 20 is thereafter threaded as at 21, and slotted as at 22, to form a split-bolt, as shown in Figs. 12 and 13.

Figure 15:
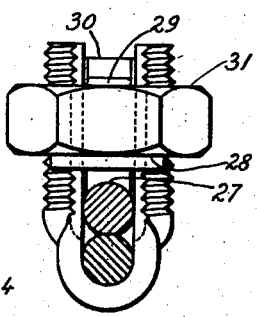
Fig. 15 is a side view of the same.
Figure 16:
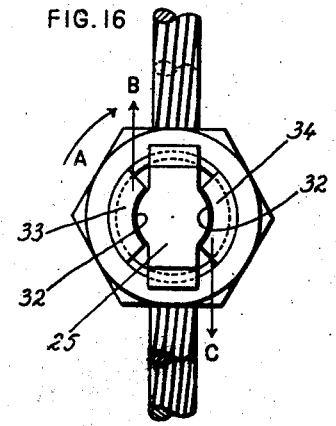
Fig. 16 is a top view of the assembled connector with a novel form of reinforcing follower.

In Figs. 14, 15 and 16, we have shown our preferred sheet metal split-bolt, 23 assembled about a pair of conductors 24. A follower 25, of unusual construction, hereinafter described, and a nut 26 completes the assembly.

Figure 21:
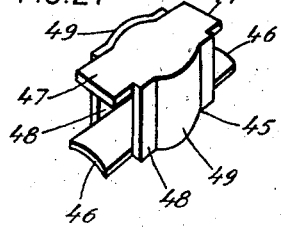
Fig. 21 is a perspective view of the reinforcing follower made from sheet metal.

The follower 25 is shown as solidly made forging, although, as may be seen in Fig. 21, it may be made of sheet metal. It is formed with a cable supporting section 27, and two nut retaining wings 28 and 29, respectively. As illustrated, the nut may be rotated about the legs of the split-bolt without rotating the follower, which rides up and down the legs of the split-bolt as propelled by the nut and the engaging wings 28 and 29 which prevent the nut from being separated therefrom. The retaining wing 29, may be made as shown, by severing a section of the upper surface 30, of the follower 25, and bending it over to engage the nut surface 31.

We have reinforced the hollow legs of the split-bolt by providing semi-cylindrical ridges 32 on the inner sides of the follower 25 which fit snugly within the hollow legs of the split-bolt and ride the inside surfaces as the nut is rotated.

Thus, as the nut is rotated in the direction indicated by the arrow A in Fig. 16, leg 33 receives a torsional stress tending to move its free end in the direction of arrow B. Similarly, arrow C, indicates the direction towards which the free end of leg 34 tends to move.

By providing the reinforcing ridges 32 on the inner sides of the follower 25, the free ends of the legs 33 and 34 are kept in their proper position and reinforced against movement. Close tolerances, obtainable by the use of sheet metal makes possible a relatively small space for movement, thus resulting in less distortion with an increased factor of reusability.

Figure 17:
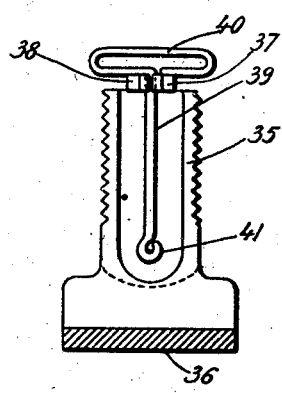
Fig. 17 is a sectional view of the split-bolt with a novel nut retainer.
Figure 19:
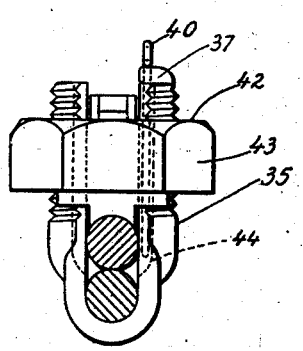
Fig. 19 is a side view of the connector with the novel nut retainer.
Figure 20:
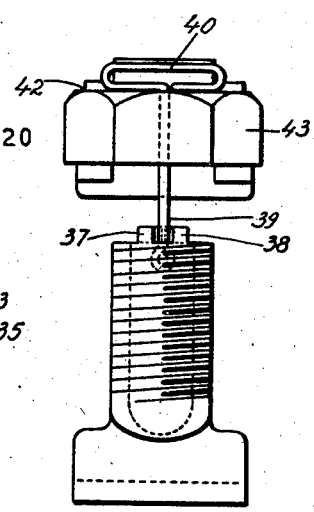
Fig. 20 is a front view of the connector, with nut held in extended position by our novel retainer.
Figure 18:
Fig. 18 is a top sectional view illustrating means for holding the nut retainer.

In Fig. 17 the upper end of the leg 35 of the split-bolt 36, is stamped with projections 37 and 38. A wire formed nut retainer 39, with stops 40 and 41, engage the upper surface 42 of the nut 43, and the bent over projections 37 and 38, respectively, to prevent separation of the nut from the retainer, or the retainer from the split-bolt.

This type of retainer is made possible by the hollows 44 formed within the cylindrically formed legs 35 of the split-bolt connector 36.

In Fig. 21 a sheet metal follower 45 is illustrated which may be substituted for the type illustrated in Fig. 16. This is made by folding over the sheet metal into a box-like construction, with wings 46 and 47 for retaining the nut therein, and sides 48, formed into ridges 49, for reinforcing the hollow legs of the split-bolt. The wing 46 may be curved so as to engage the curved cable, supported within the split-bolt.

Figure 22:
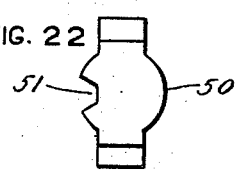
Fig. 22 is a top view of a reinforcing follower with a channel for the nut retainer.

In Fig. 22, the reinforcing follower 50 is provided with an inwardly formed channel 51 to provide space for the nut retainer 39 and bent over projections 37 and 38. Thus, the legs of the split-bolt may be reinforced and applicant's novel type of nut retainer all incorporated in the sheet metal split-bolt connector. Obviously, the follower 50 may be solidly constructed as shown in Fig. 16, or of sheet metal as shown in Fig. 21.

We have in the foregoing devices provided a connector made of resilient sheet metal adapted for manufacture by mass production methods, wherein waste of material is held to a minimum. We use sheet metal, a material in which maximum hardness may be obtained with the greatest homogeniety—and free from defects apt to cause fractures when over stressed.

By making the legs of the split bolt of sheet metal, we obtain segmental pockets, which we reinforce and interlock by our improved follower, thereby strengthening the legs and preventing movement and subsequent distortion.

Galling is prevented by the use of extremely hard alloys obtainable in sheet metal form, which will not wear or seize readily. In addition, sheet metal made from properly selected alloys will enable us to obtain a resiliency, necessary for restoring the legs of the spit bolt to their original position, as well as an accuracy in the stamping process for obtaining close tolerances necessary for close fitting parts.

By utilizing the segmental pocket in the leg, we provide a novel nut retainer which is simple to make and assemble.

We have thus described our invention, but we desire it understood that it is not confined to the particular forms or uses shown and described, the same being merely illustrative, and that the invention may be carried out in other ways without departing from the spirit of our invention and, therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

What we claim and desire to secure by Letters Patent, is a follows:

1. A split-bolt formed of a single sheet of metal and comprising a centrally located substantially semi-cylindrical head for supporting a cylindrical conductor, and a pair of extending threaded legs, integral with said head and bent at right angles thereto and a flat wrench-engaging surface, for applying a tool thereto, positioned between the threaded section of the legs and the semi-cylindrical head, said legs cylindrically formed with external and internal concentrically arranged surfaces, the external surfaces of which are threaded for engagement with a nut.

2. A split-bolt connector having a split-bolt, a pressure bar, a nut, and a nut retainer, said split-bolt formed of a single sheet of metal and comprising a centrally located head, and a pair of extending legs, integral with said head and bent at right angles thereto, said legs cylindrically formed with external and internal concentrically arranged surfaces, the external surfaces of which are threaded for engagement with said nut; said nut retainer comprising an elongated metallic means having a head at one end for slidable engagement between said nut and pressure bar, and another head at the remaining end for engagement with only one of the legs of said split-bolt, said elongated metallic means slidably attached to and lying within the engaging leg along its internal cylindrically formed surface.

3. A split-bolt connector having a split-bolt, a pressure bar, a nut, and a nut retainer, said split-bolt formed of a single sheet of metal and comprising a centrally located head, and a pair of extending legs, integral with said head and bent at right angles thereto, said legs cylindrically formed with external and internal concentrically arranged surfaces, the external surfaces of which are threaded for engagement with said nut, one of said legs provided with a bent over projection at its free end for slidable engagement with said nut retainer; said nut retainer comprising an elongated metallic means having a head at one end for slidable engagement between said nut and pressure bar, and another head at the remaining end for engagement with said bent over projection; said elongated metallic means slidably attached to and lying within the engaging leg along its internal cylindrically formed surface.

4. A split-bolt connector having a split-bolt, a nut, and a follower, said split-bolt formed of a single sheet of metal and comprising a centrally located head, and a pair of extending legs, integral with said head and bent at right angles thereto, said legs cylindrically formed with external and internal concentrically arranged surfaces, the external surfaces of which are threaded for engagement with said nut; said follower comprising a main body section having an upper and lower surface and two sides; a pair of wing sections, extending from the upper and lower surfaces of said follower, for engagement with the upper and lower surfaces of said nut, allowing said nut to rotate freely therein, said two sides arcuately formed to fit snugly within the internal cylindrically formed surfaces of said legs whereby said follower may ride said surfaces when said follower is propelled along said legs by said nut.

5. A split-bolt connector having a split-bolt, a nut, and follower; said split-bolt formed of a single sheet of metal and comprising a centrally located head, and a pair of extending legs, integral with said head and bent at right angles thereto, said legs cylindrically formed with external and internal concentrically arranged surfaces, the external surfaces of which are threaded for engagement with said nut; said follower formed of sheet metal and comprising a main body section having an upper and lower surface, and two sides, a pair of wing sections made of sheet metal extending from the upper and lower surfaces of said follower, and adapted to engage the upper and lower surfaces of said nut, allowing said nut to rotate freely therein, said two sides made of sheet metal and arcuately formed to fit snugly within the internal cylindrically formed surfaces of said legs whereby said follower may ride said surfaces when said follower is propelled along said legs by said nut.

BERN DIBNER.
JULIAN ROGOFF.